Aug. 5, 1924.  
H. B. FOLEY  
1,503,684  
AUXILIARY TRACTION WHEEL RIM  
Original Filed Oct. 13, 1920
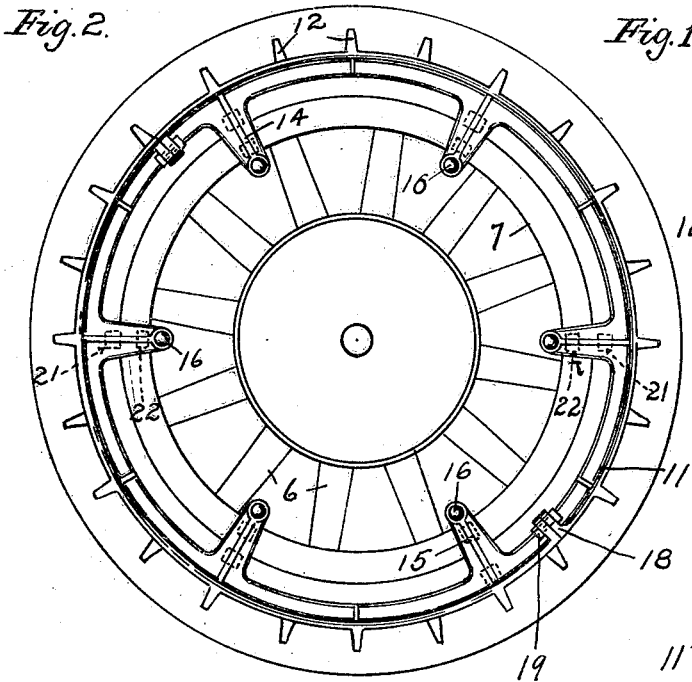
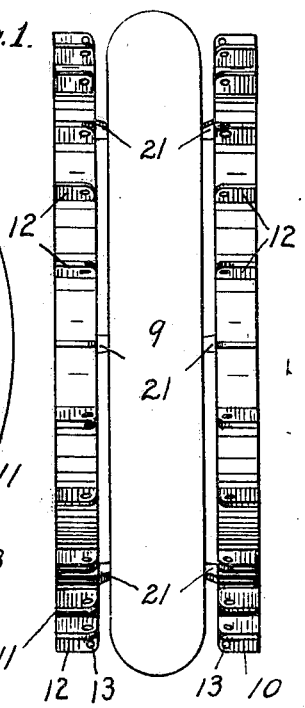
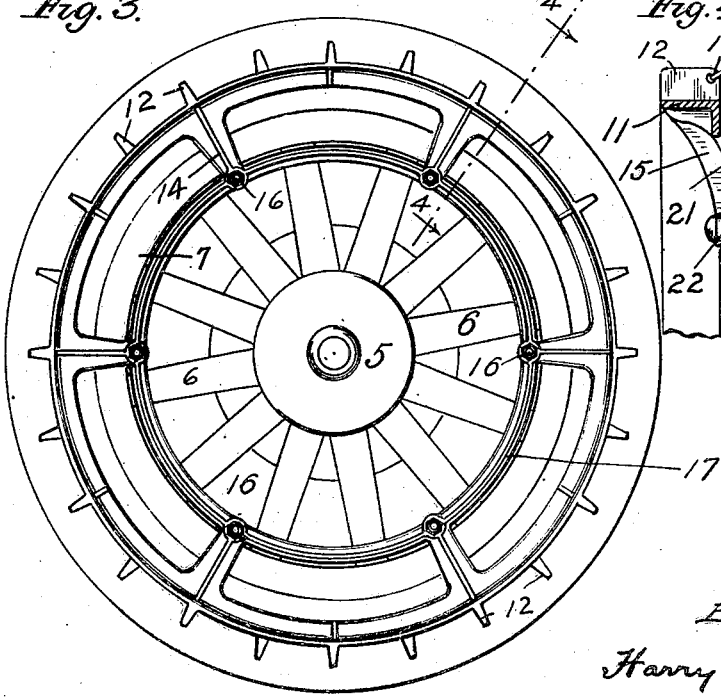
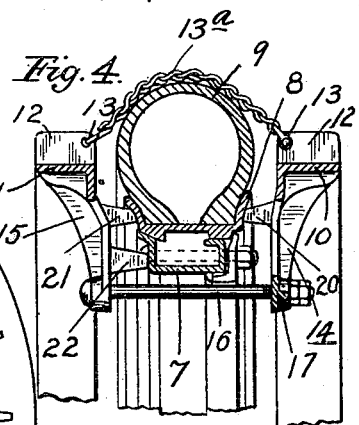
Inventor  
HUGH B. FOLEY  
By his Attorney  
Harry D. Kilgore Patented Aug. 5, 1924.

1,503,684

UNITED STATES PATENT OFFICE.

HUGH B. FOLEY, OF MINNEAPOLIS, MINNESOTA.

AUXILIARY TRACTION-WHEEL RIM.

Application filed October 13, 1920, Serial No. 416,728. Renewed January 2, 1924.

*To all whom it may concern:*

Be it known that I, HUGH B. FOLEY, a citizen of the United States, residing at Minneapolis, in the county of Hennepin and State of Minnesota, have invented certain new and useful Improvements in Auxiliary Traction-Wheel Rims, and I do hereby declare the following to be a full, clear, and exact description of the invention, such as will enable others skilled in the art to which it appertains to make and use the same.

My invention relates to traction rims for the wheels of motor-propelled vehicles, and has for its object to improve the same in the several parts hereinafter noted. Certain features of the present invention adapt the same especially for use in connection with wheels equipped with pneumatic tires, but the rims are, nevertheless, adapted for more general use.

In the accompanying drawings, which illustrate the invention, like characters indicate like parts throughout the several views.

Referring to the drawings:

Fig. 1 is a plan view showing a wheel equipped with a pneumatic tire and rim, traction wheels designed and applied in accordance with my invention;

Fig. 2 is a side elevation of the wheel and rims shown in Fig. 1, looking at the inner side of the wheel;

Fig. 3 is an elevation of the wheel and rims, looking at the outer side of the wheel; and Fig. 4 is an enlarged section on the line 4—4 of Fig. 3.

The wheel illustrated is of the type used on automobile wheels and traction wheels that are equipped with pneumatic tires, and, of the parts thereof, it is only desirable, for the purpose of this case, to particularly note the wheel hub 5, spokes 6, metallic wheel felloe 7, demountable wheel rim 8 and pneumatic tire 9, which parts may be assumed to be of standard or well known construction.

In accordance with my invention, I provide outside and inside auxiliary traction rims 10 and 11, respectively. These two traction rims are preferably annular structures of the same diameter provided with outstanding traction lugs 12, shown as having perforations 13 that adapt chains, 13ᵃ to be applied over the outer face of the pneumatic tire. The outside rim 10 has arms 14 that project radially inward to points radially inward of the inner surface of the felloe 7, and the inside rim 11 has arms 15 that correspond to the arms 14 and are transversely opposite to the same, so that nut-equipped clamping bolts 16 may be passed through perforations in the inner ends of said arms 14 and 15. The inner ends of the arms 14 of the outside rim are connected by a tie-ring 17, preferably cast integral therewith. The outside rim 10, its arms 14 and tie-ring 17 are preferably cast in one piece, but the inside rim 11, to facilitate its application without removal of the vehicle wheel, is cast or made in two parts provided at diametrically opposite points with inwardly projecting ears 18, through which the nut-equipped bolts 19 may be passed to rigidly connect the two sections of said inside rim.

The arms 14, of the outside rim 10, are provided with inwardly projecting bearing lugs 20 that engage the slightly concave outer flange of the demountable rim 8 and, in like manner, the arms 15, of the inside rim 11, are provided with bearing lugs 21 that engage the concave inside flange of said rim 8. The ends of the lugs 20 and 21 are preferably rounded so that, when they are tightly drawn against the concave flanges of the demountable rim 8, they will center the traction rims 10 and 11 in respect to the wheel, as well as properly space the said rims from the wheel rim 8 and from the casing of the tire 9. This leaves annular spaces between the sides of the pneumatic tire and the adjacent faces of the traction rims 10 and 11, and these spaces are important for several reasons, as will presently appear.

The arms 14, of the outside rim, are tied together and considerably pressed by the tie-ring 17. To prevent the arms 15, of the inside rim, from springing under the tension applied by the nut-equipped clamping bolts 16, said arms 15 are shown as provided with additional lugs 22 that will bear against the adjacent side of the felloe 7, as best shown in Fig. 4.

By reference to Figs. 1 and 4, it will be noted that when the pneumatic tire 9 is inflated, its tread surface will be radially outward not only of the peripheral faces of the rims 10 and 11, but of the outermost portions of their traction lugs 12. Hence, when the tire is well inflated and the vehicle is running on a hard road bed, only the pneumatic tire will be brought into action and the auxiliary rims will run idle or out of action. When the wheels run on soft road beds or soft ground, the tire will settle into the same, so that the traction rims will come into action and thereby afford not only additional load-carrying surface, but very greatly additional traction. In running on the mud or very soft roads or soft ground, the mud or dirt can work freely between the pneumatic tire and the rims, hence, will not pack and form a smooth surface on the traction surface of the complete wheel.

In case of a puncture or deflation of the pneumatic tire, the load will be carried by the traction wheels and the deflated tire will be relieved from the load and will not be crushed or damaged by the use of the wheel while the tire is deflated or soft. In thus using the wheel with a deflated tire, if the road bed is hard, the wheel will run on the traction lugs 12, but if the road is somewhat soft, the load will be carried on the peripheries of said traction rims, but, in any event, the soft or deflated tire will be relieved from the load-carrying weight and thus protected from damage.

These improved so-called auxiliary traction rims have been commercially used and found to be highly satisfactory. They are preferably cast steel structures, but may be made of malleable iron or otherwise formed. Moreover, they may be quickly applied to or removed from vehicle wheels. While especially adapted for use in connection with wheels having pneumatic tires, they may be applied to wheels equipped with tires of various other construction.

What I claim is:

1. The combination with a vehicle wheel, of inside and outside traction rims having arms projecting radially inward therefrom, said arms having lugs engageable with the wheel rim, and bolts connecting the arms of said outside and inside rims and clamping said rims to said wheel, said inside rim being a sectional structure having means for rigidly connecting its sections.

2. The combination with a vehicle wheel, of inside and outside traction rims having arms projecting radially inward therefrom, said arms having integral laterally offset lugs engageable with the wheel rim, and bolts connecting the arms of said outside and inside rims and clamping said rims to said wheel, the arms of said outside rim being rigidly connected by a tie-ring.

3. The combination with a vehicle wheel, of inside and outside traction rims having arms projecting radially inward therefrom, said arms having integral laterally offset lugs engageable with the wheel rim, and bolts connecting the arms of said outside and inside rims and clamping said rims to said wheel, the arms of said outside rim being rigidly connected by a tie-ring cast integral therewith.

4. The structure defined in claim 3 in which said inside rim is made in sections and the sections rigidly connected together.

5. The combination with a vehicle wheel having a rim, of inside and outside supplemental traction rims having portions that project radially inward and having laterally projecting lugs that engage the wheel rim, and bolts connecting the inwardly projecting portions of said outside and inside rims and clamping said rims to said wheel.

6. The combination with a vehicle wheel having a demountable rim, of inside and outside supplemental traction rims having portions that project radially inward and having laterally projecting lugs, certain of which engage the wheel rim and certain of which engage the wheel felloe, and bolts connecting the inwardly projecting portions of said outside and inside rims and clamping said rims to said wheel.

In testimony whereof I affix my signature.

HUGH B. FOLEY.